United States Patent
Vitt et al.

(10) Patent No.: US 12,442,309 B2
(45) Date of Patent: Oct. 14, 2025

(54) NOZZLE ASSEMBLY FOR TURBINE ENGINE

(71) Applicant: General Electric Company, Schenectady, NY (US)

(72) Inventors: Paul Hadley Vitt, Liberty Township, OH (US); Wilson Frost, Cincinnati, OH (US); Mark Broomer, Lynn, MA (US)

(73) Assignee: General Electric Company, Evendale, OH (US)

( * ) Notice: Subject to any disclaimer, the term of this patent is extended or adjusted under 35 U.S.C. 154(b) by 125 days.

(21) Appl. No.: 16/568,730

(22) Filed: Sep. 12, 2019

(65) Prior Publication Data

US 2021/0079799 A1   Mar. 18, 2021

(51) Int. Cl.
*F01D 9/04* (2006.01)

(52) U.S. Cl.
CPC .......... *F01D 9/042* (2013.01); *F05D 2220/32* (2013.01); *F05D 2240/128* (2013.01)

(58) Field of Classification Search
CPC .......... F01D 9/042; F05D 2220/32; F05D 2240/128; F04D 29/68
See application file for complete search history.

(56) References Cited

U.S. PATENT DOCUMENTS

| | | | |
|---|---|---|---|
| 3,600,781 A | 8/1971 | Scott | |
| 5,299,909 A | 4/1994 | Wulf | |
| 5,397,215 A * | 3/1995 | Spear | F01D 9/02 415/191 |
| 6,261,053 B1 * | 7/2001 | Anderson | F01D 11/04 415/115 |
| 6,276,897 B1 * | 8/2001 | Tarada | F01D 5/186 415/115 |
| 6,558,121 B2 | 5/2003 | Zhu et al. | |
| 6,579,061 B1 * | 6/2003 | Heyward | F01D 5/143 415/189 |
| 6,669,445 B2 * | 12/2003 | Staubach | F01D 5/143 416/193 A |
| 6,672,832 B2 * | 1/2004 | Leeke | F01D 5/143 415/191 |
| 6,969,232 B2 * | 11/2005 | Zess | F04D 29/544 415/191 |

(Continued)

FOREIGN PATENT DOCUMENTS

| | | |
|---|---|---|
| CN | 1100495 A | 3/1995 |
| CN | 104061024 A | 9/2014 |

(Continued)

*Primary Examiner* — Nathaniel E Wiehe
*Assistant Examiner* — Theodore C Ribadeneyra
(74) *Attorney, Agent, or Firm* — Hanley, Flight & Zimmerman, LLC (57) ABSTRACT

An apparatus for a nozzle assembly for a turbine engine and a method of forming the nozzle assembly are described herein. The nozzle assembly can include a set of nozzles including an inner band and an outer band, with one or more airfoils extending between the inner and outer bands. The nozzles can be coupled to adjacent nozzles at the inner and outer bands to form the nozzle assembly. A throat can be defined at the minimum cross-sectional area between adjacent airfoils in the nozzle assembly. A formed portion can be formed on either of or both of the inner or outer band at the throat.

18 Claims, 8 Drawing Sheets

(56) References Cited

U.S. PATENT DOCUMENTS

| | | | |
|---|---|---|---|
| 7,186,070 B2 | 3/2007 | Morris et al. | |
| 7,195,454 B2 | 3/2007 | Lu et al. | |
| 7,217,096 B2* | 5/2007 | Lee | F01D 5/186 |
| | | | 416/97 R |
| 7,806,650 B2 | 10/2010 | Heyward et al. | |
| 8,047,771 B2* | 11/2011 | Tucker | B23K 1/008 |
| | | | 415/137 |
| 8,439,643 B2* | 5/2013 | Kuhne | F01D 5/20 |
| | | | 416/193 A |
| 8,459,956 B2* | 6/2013 | Pandey | F01D 5/145 |
| | | | 416/243 |
| 8,961,135 B2* | 2/2015 | Beeck | F01D 5/22 |
| | | | 416/97 R |
| 9,121,282 B2* | 9/2015 | Macelroy | F01D 9/04 |
| 9,976,433 B2* | 5/2018 | Praisner | F01D 11/00 |
| 10,030,537 B2 | 7/2018 | Dutta et al. | |
| 10,228,669 B2 | 3/2019 | Dunkin | |
| 10,344,601 B2* | 7/2019 | Turner | F01D 5/30 |
| 10,364,690 B2* | 7/2019 | Farah | F02C 7/20 |
| 10,370,986 B2 | 8/2019 | Heitman et al. | |
| 10,378,360 B2* | 8/2019 | Carrico | F01D 5/143 |
| 10,480,333 B2* | 11/2019 | Molony | F01D 9/042 |
| 10,577,955 B2* | 3/2020 | Shirley | F01D 9/041 |
| 10,590,781 B2* | 3/2020 | Correia | F01D 9/041 |
| 10,760,426 B2 | 9/2020 | Vitt et al. | |
| 11,156,152 B2 | 10/2021 | Huscher | |
| 11,333,041 B2 | 5/2022 | Czarnecki et al. | |
| 2006/0078422 A1* | 4/2006 | Morris | F01D 9/041 |
| | | | 415/191 |
| 2009/0169361 A1* | 7/2009 | Cole | F01D 5/082 |
| | | | 415/115 |
| 2010/0077612 A1* | 4/2010 | Tudor | F16J 15/062 |
| | | | 29/889.22 |
| 2010/0303627 A1* | 12/2010 | Megerle | F01D 5/145 |
| | | | 416/179 |
| 2011/0123322 A1* | 5/2011 | Allen-Bradley | F04D 29/324 |
| | | | 415/191 |
| 2013/0004320 A1 | 1/2013 | Perret et al. | |
| 2013/0108433 A1* | 5/2013 | Green | F01D 5/143 |
| | | | 415/208.2 |
| 2014/0186164 A1* | 7/2014 | Koonankeil | B23H 7/265 |
| | | | 415/175 |
| 2014/0286758 A1 | 9/2014 | Senn | |
| 2015/0132122 A1* | 5/2015 | Lohaus | F01D 5/3053 |
| | | | 415/209.2 |
| 2015/0354393 A1 | 12/2015 | Lipkin et al. | |
| 2016/0053622 A1* | 2/2016 | Farah | F01D 25/005 |
| | | | 415/200 |
| 2016/0061046 A1* | 3/2016 | Ols | F01D 5/143 |
| | | | 415/211.1 |
| 2016/0160670 A1* | 6/2016 | Aggarwala | F01D 5/02 |
| | | | 415/122.1 |
| 2016/0297044 A1 | 10/2016 | Dunkin et al. | |
| 2016/0298470 A1* | 10/2016 | Fukuda | F01D 9/041 |
| 2018/0283190 A1 | 10/2018 | Jaiswal et al. | |
| 2018/0347370 A1* | 12/2018 | Lacy | F01D 5/187 |
| 2019/0323355 A1* | 10/2019 | Shahpar | F23R 3/50 |
| 2020/0318484 A1* | 10/2020 | Ramirez | F01D 5/143 |

FOREIGN PATENT DOCUMENTS

| | | |
|---|---|---|
| CN | 106368743 A | 2/2017 |
| CN | 106988791 A | 7/2017 |
| CN | 109083690 A | 12/2018 |
| CN | 109505662 A | 3/2019 |
| CN | 110195616 A | 9/2019 |

* cited by examiner

NOZZLE ASSEMBLY FOR TURBINE ENGINE

TECHNICAL FIELD

This disclosure generally relates to nozzles, throats, airfoil arrangements, and/or vanes in turbine engines, and more particularly to an apparatus and method for controlling tolerances for throats in fabricated assemblies.

BACKGROUND

Turbine engines, and particularly gas or combustion turbine engines, are rotary engines that extract energy from a flow of combusted gases passing through the engine onto a multitude of rotating turbine blades, which can be arranged in multiple turbine blade assemblies. In alternating arrangement, a multitude of stationary turbine vanes are provided axially between sets of turbine blades, defining stages as containing one annular set of rotating blades and one annular set of stationary vanes.

Engine throats are defined between adjacent stationary vanes, which collectively define the engine throat. The engine throat has a direct impact on engine efficiency and performance. Therefore, controlling fabrication of the throat is important, and very tight control tolerances can provide for adjustment or improvement to engine operability, performance, efficiency, and thrust, for example.

BRIEF DESCRIPTION

In one aspect, the present disclosure relates to an a nozzle assembly for a turbine engine, the nozzle assembly comprising: an outer band; an inner band spaced from the outer band; a set of airfoils extending between the outer band and the inner band and defining a throat as a minimum cross-sectional area between adjacent airfoils of the set of airfoils; and at least one formed portion provided on one of the outer band or the inner band at the throat, with a volume of the formed portion removed at the throat to define the throat.

In another aspect, the present disclosure relates to a method of forming a nozzle assembly for a turbine engine, the method comprising: forming a nozzle having an inner band and an outer band, with at least one airfoil coupled to and extending between the inner band and the outer band, with the at least one airfoil partially defining a throat; forming additional material on at least one of the inner band or the outer band at the throat; and machining the additional material to form a formed portion at the throat.

In yet another aspect, the present disclosure relates to a nozzle for a turbine engine comprising: an outer band; an inner band spaced from the outer band; a first airfoil extending between the outer band and the inner band; a second airfoil extending between the outer band and the inner band, spaced from the first airfoil and defining a throat as a minimum cross-sectional area defined between the first airfoil and the second airfoil; a formed portion formed on at least one of the outer band or the inner band at the throat and partially defining the minimum cross-sectional area for the throat.

DETAILED DESCRIPTION

Aspects of the disclosure described herein are directed to a method and apparatus for forming a throat in a nozzle assembly for a turbine engine. More specifically, adding material at the throat on the inner or outer band can then be formed, machined, or otherwise varied to be within specific engine tolerances without significantly impacting engine efficiency and performance. For purposes of illustration, the present disclosure will be described with respect to a turbine nozzle in the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward means upstream and aft/rearward means downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order, and relative sizes reflected in the drawings attached hereto can vary.

Figure 1:
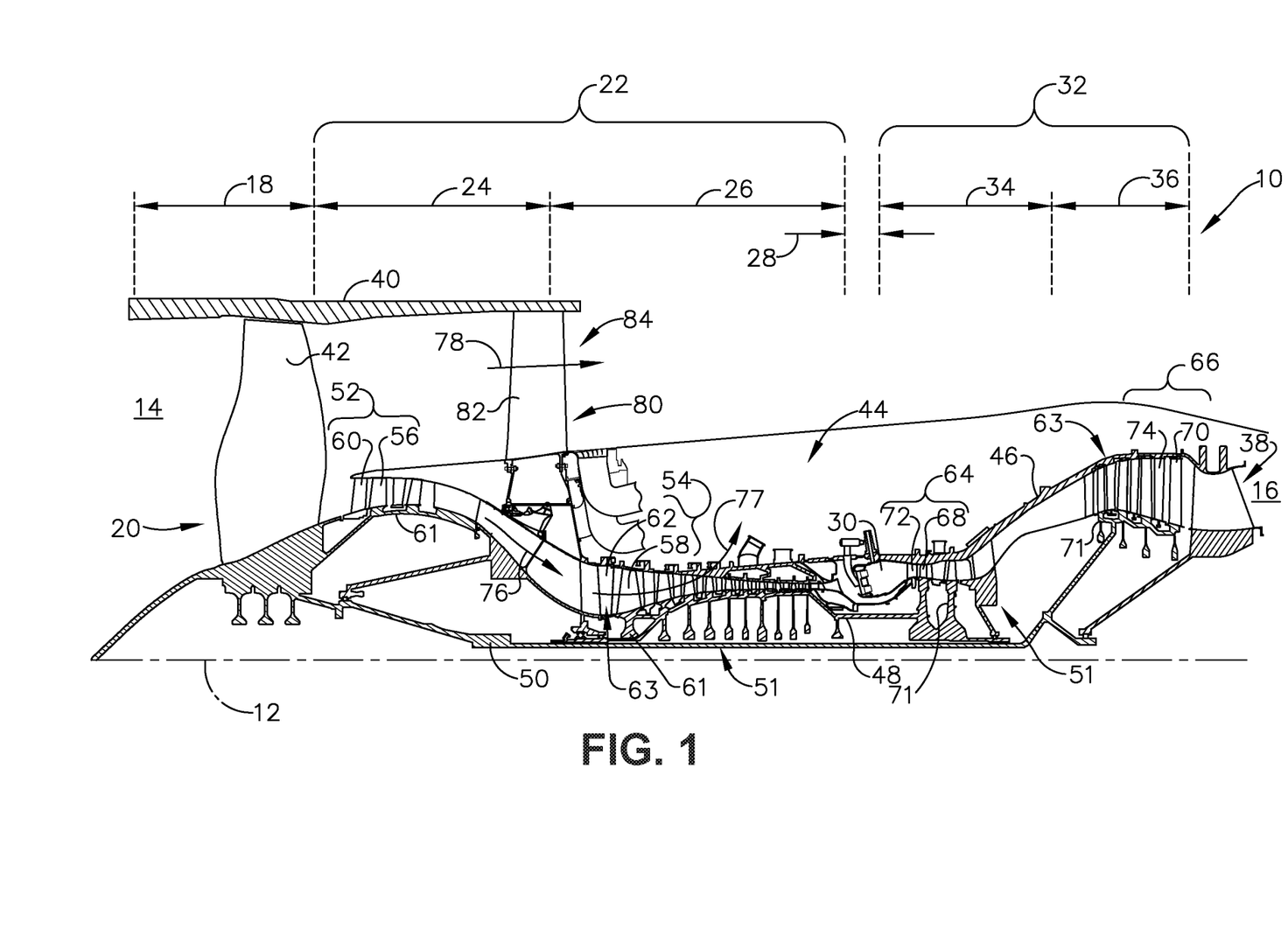
FIG. 1 is a schematic cross-sectional diagram of a turbine engine for an aircraft containing an annular ring of stationary vanes.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 exiting the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
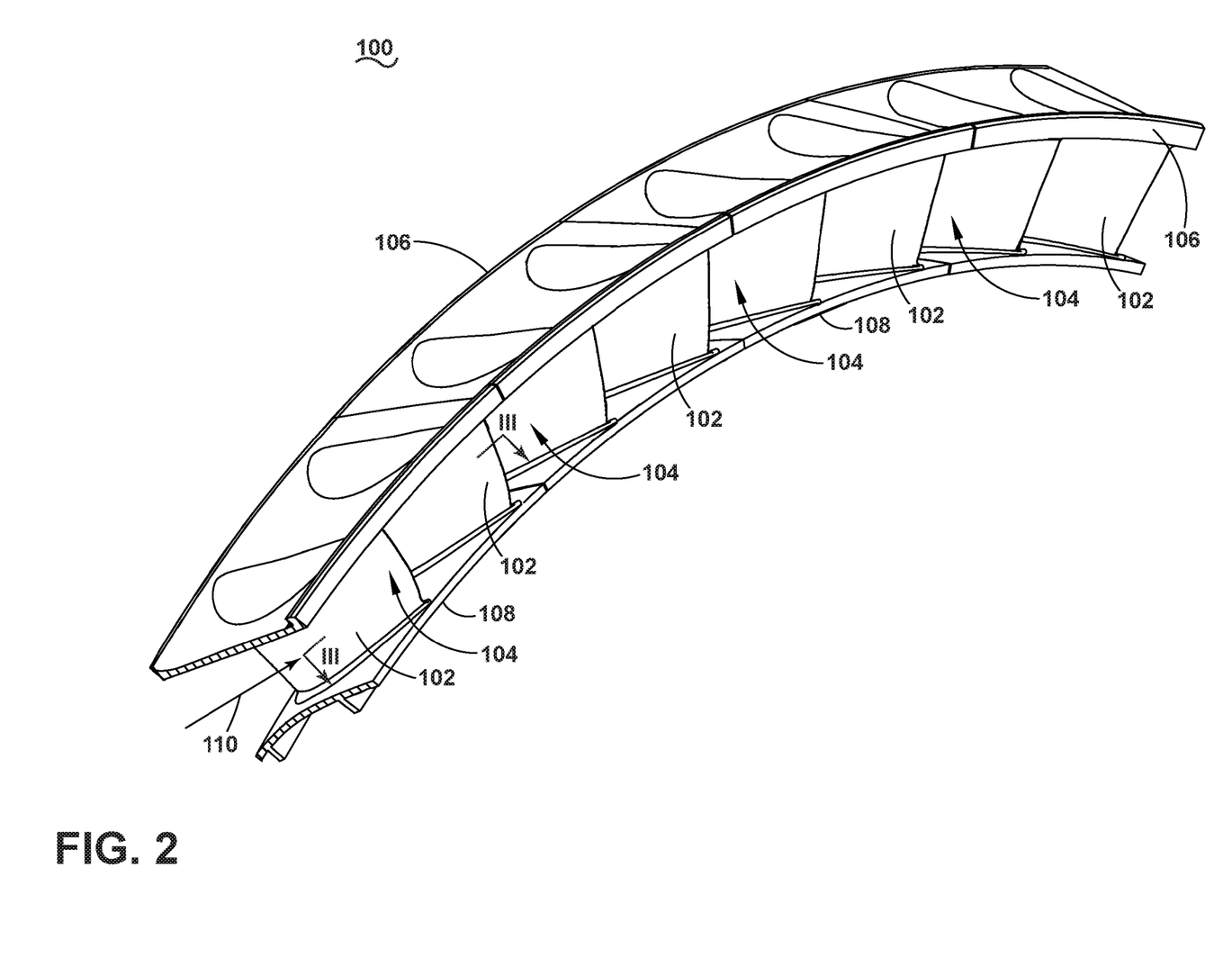
FIG. 2 is a perspective view of a portion of the annular ring containing multiple interconnected nozzles.

Referring now to FIG. 2, a portion of a nozzle assembly 100 containing an annular set of airfoils 102, such as the vanes 72 of the first turbine stage 64 downstream of the combustor 30 of FIG. 1, for example, while any suitable position for the nozzle assembly 100 axially along the engine 10 is contemplated. The airfoils 102 can be arranged as vane nozzles 104, with each nozzle 104 including a doublet as containing two airfoil vanes 102, while any number of vanes on each nozzle 104 is contemplated. (See FIG. 5, for example containing three vanes.) More specifically, in another example, a single-piece fabricated nozzle having all airfoils mounted between an inner band and an outer band as a single, unitary, fabricated piece. In another example, a single airfoil could extend between an inner band and an outer band to form the nozzle assembly, and can be interconnected to other nozzle assemblies to form the nozzles between adjacent airfoils of the adjacent nozzle assemblies. Thus, it should be appreciated that the particular nozzle assembly can include a myriad of forms, such that a set of airfoils are provided annularly to form a set of nozzles. The nozzles 104 are coupled together in an annular arrangement, which extend circumferentially around the engine 10 forming the nozzle assembly 100.

Each nozzle 104 includes a radially outer band 106 and a radially inner band 108, with two airfoils 102 extending between the outer and inner bands 106, 108. The nozzles 104, in non-limiting examples, can be uncooled nozzles without receiving internal cooling from an exterior source, or can be subsonic nozzles adapted to operate under flow speeds less than the speed of sound, while cooled and supersonic nozzles are contemplated. While only four nozzles 104 are illustrated, it should be understood that a plurality of nozzles 104 can be arranged to form the annular nozzle assembly 100. A flow path 110 can be defined for an airflow passing through the nozzle assembly 100, between the outer and inner bands 106, 108 and through the airfoils 102. The annular geometry of the nozzle assembly 100 defines a total cross-sectional area as the sum of all nozzles arranged in an annular fashion to define the total flow path 110 at the nozzles 104. The total flow area for the assembly can be the minimum area defined as the total cross-sectional area that sets the core flow for the engine, which can control overall engine operability or compressor efficiency. The nozzles 104 and airfoils 102 contained therein provide for turning the airflow, such that the airflow reaching the blades 68 is provided at an optimal direction, angle, or orientation to extract as much energy as possible from the compressed airflow with the blades downstream of the airfoils 102.

Figure 3:
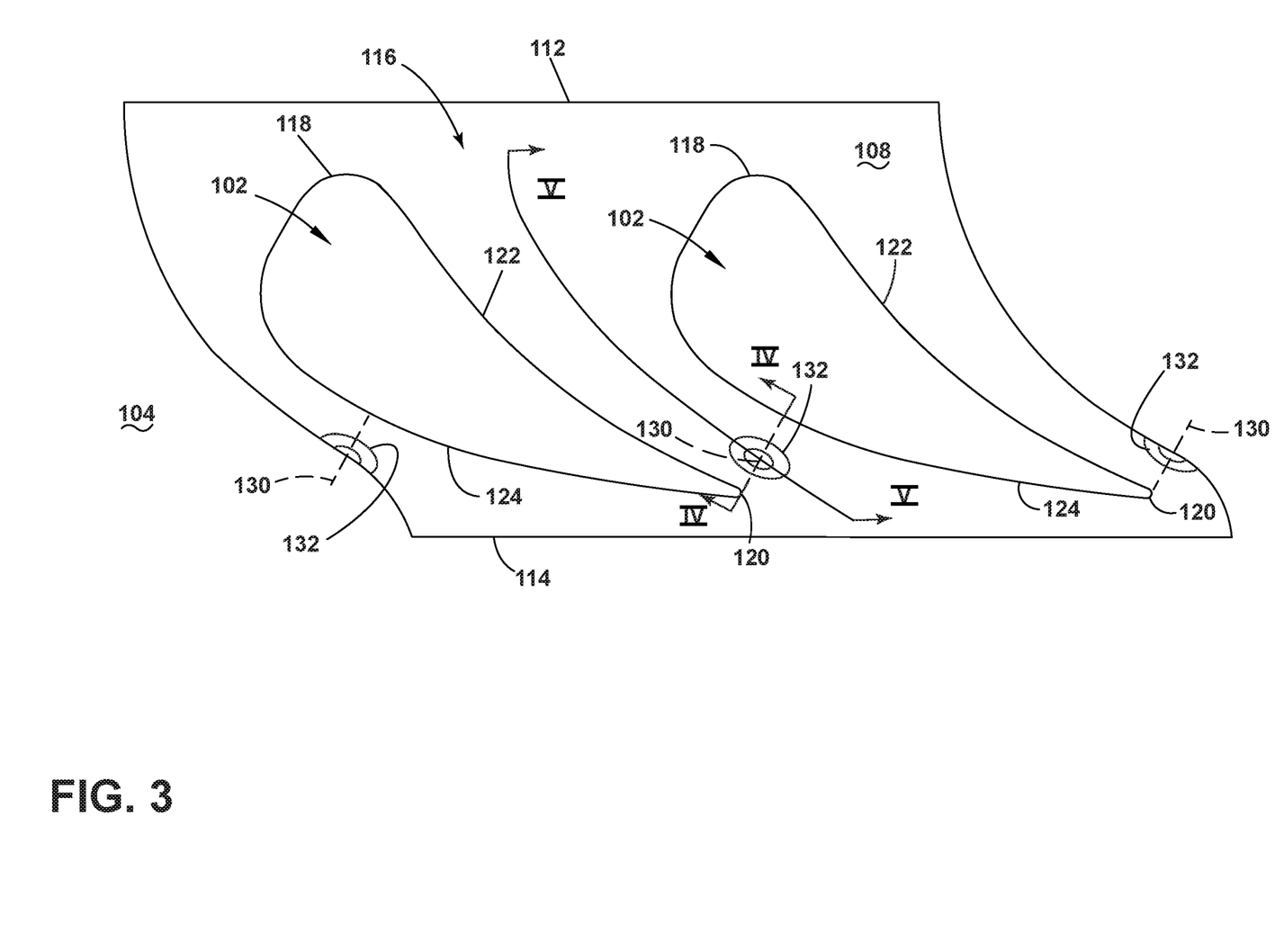
FIG. 3 is a cross-sectional view of one pair of nozzles from the annular ring of multiple nozzles of FIG. 2 taken across section showing a throat with a formed portion.

Referring to FIG. 3, an axial section of one nozzle 104 of the nozzle assembly 100 is shown, looking radially inward at the inner band 108, with the inner band 108 including a forward edge 112 and an aft edge 114. In one example, the nozzle assembly 100 can be provided at the high pressure turbine, or at the first stage of the high pressure turbine, while any position in the engine is contemplated, including in non-limiting examples, the high pressure turbine, the low pressure turbine, the compressor, the struts, or any other engine portion utilizing an airfoil or throat, as well as any stage among the compressor or turbine. An airflow direction 116 can be defined, passing in a direction from the forward edge 112 to the aft edge 114, passing through the airfoils 102, as well as defining a leading edge 118 and a trailing edge 120 for each vane 102. Furthermore, each vane 102 includes a pressure side 122 and a suction side 124.

A throat 130 can be defined between adjacent airfoils 102 as the minimum cross-sectional area between the adjacent airfoils 102, while it is contemplated that the throat, as used herein, can be defined as the minimum cross-sectional area between adjacent airfoils, such as vanes, blades, or any other feature which can define the minimum cross-sectional area along the mainstream flow path either locally, or along the entirety of the engine. It should be appreciated that the adjacent airfoils 102 need not be on a common nozzle 104, but can be adjacent airfoils 102 among adjacent nozzles 104, particularly in the example where the nozzles 104 are formed by a single vane extending between the inner and outer bands. The throat 130 may be defined between the trailing edge 120 of the vane 102 and the suction side 124 of the adjacent vane 102, for example, while it is contemplated that the throat 130 be defined anywhere along the chord-wise extent of adjacent airfoils 102. The throat 130 can be defined as the minimum cross-sectional area between adjacent airfoils, which can effectively limit or define the flow rates or flow volumes of air passing through the engine, which can be used to define engine efficiency, operability, performance, and thrust in non-limiting examples. Additionally, a throat area can be defined as the throat at each section of the airfoils along the span of the airfoils between two adjacent airfoils.

Traditional fabrication techniques, such as casting or brazing, for example, do not provide for or typically produce tight tolerances at the throat without high costs or a low yield. However tight tolerances for the throat can provide for maximizing engine performance, providing for the compressor to run as optimally as possible without operability issues. As the compressor must be set to accommodate all versions of the turbine nozzle area, the tighter the area of the throat that can be controlled provides for the closer the compressor can be set to its peak efficiency. Thus, the use of a formed portion 132 at the throat 130 can provide for achieving tight tolerances at the throat 130 with a high yield.

The formed portion 132 can be provided on the inner band 108 between the adjacent airfoils 102 and aligned at the throat 130, such as with a central portion of the formed portion 132 aligned along the throat 130. The formed portion 132 can be spaced from the adjacent airfoils 102, while it is contemplated that the formed portion 132 extends to the airfoils 102, or any portion therebetween. In one example, the formed portion 132 can be symmetrically or equally spaced from the adjacent airfoils 102, while an offset or uneven orientation is also contemplated. The formed portion 132 can have any aerodynamically efficient shape, such as an ellipsoidal shape or a semi-ellipsoidal shape, for example, with such a shape being effective at reducing or minimizing flow separation, or maintaining flow attachment. Desirably, the shape of the formed portion 132 provides for minimal or no impact on aerodynamic efficiency, while providing for raising the overall engine performance. As such, a rounded surface with minimal and non-drastic changes in geometry or elevation are useful. However, it should be appreciated that a balance can be struck between maintaining throat tolerances and airflow performance at the throat 130. Such a balance may include utilizing lesser tolerances in order to improve overall performance. It should be further appreciated that the formed portion 132 as described herein can mean formed, as in a formed portion, as being created, varied, changed, made, cast, machined, added, welded, brazed, manufactured, or otherwise formed as described.

The formed portion 132 can be a portion of the nozzle assembly 100 that has been formed to be within very tight tolerances for the engine. Prior to being the formed portion 132, the same or smaller area can be met at a maximum deviation in the nozzle assembly 100 when fabricated, such as being made at maximum deviation or having additional material (see FIG. 4) being coated or applied to the nozzle assembly 100. Thus, the initial fabrication process can be set to produce a mean throat area that is less than the target, with the maximum deviation being no larger than the maximum acceptable throat area. Looking briefly at FIG. 4, an added portion 142 can then be formed to a final shape as the formed portion 132 having a tight tolerance by machining and removing the additional material. Removing the material to form the formed portion 132 can be achieved by any suitable method to achieve the throat 130 within the tight tolerances, such as by adaptive machining, grinding, or grit blasting in non-limiting examples, while any suitable method for removing material to define the throat 130 within the tight tolerances is contemplated.

Additionally, there can be a braze or a weld formed at the junction between adjacent nozzles 104 when forming the annular nozzle assembly 100, which can provide for significant variation at the throats 130, which can be outside of specified tolerances. Utilizing the formed portion 132 provides for tighter tolerances for the throats at the junction between the adjacent nozzles 104 as well as across multiple nozzles 104 in the nozzle assembly 100, particularly where the braze or weld would otherwise create a significant local variation.

Figure 4:
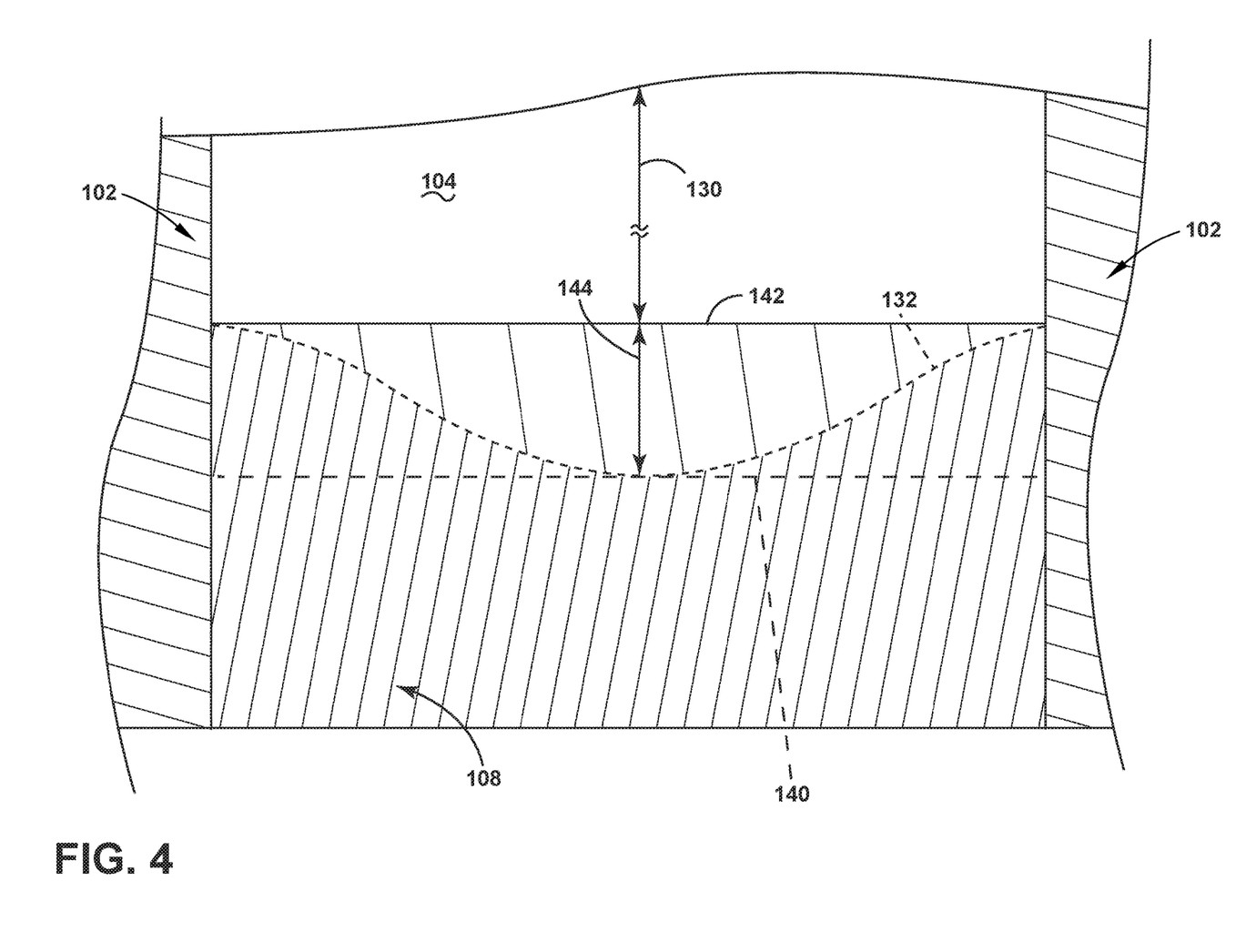
FIG. 4 is a cross-sectional view of the throat and the formed portion of FIG. 3 taken across section IV-IV.

Referring to FIG. 4, taken across section IV-IV of FIG. 3, the profile of the formed portion 132 can be appreciated. A line 140 can be defined as a baseline level for material at the throat 130 along the band 108, or the band 108 itself, which can be substantially consistent with the extent of the inner band 108 of the nozzle assembly 100. The line 140 can be parallel to the engine centerline 12 of FIG. 1, for example, while it is contemplated that the line 140 can alternatively be offset, curved, or otherwise shaped or oriented in order to be consistent with the rest of the nozzle assembly 100. The exact arrangement, orientation, or geometry of the line 140 is not pertinent to the disclosure, but rather can be used as a reference for identifying the geometry of the formed portion 132 and an additional material 142 used in forming the formed portion 132. Utilizing the band 108 and airfoils 102 with the additional material 142 can provide for producing high yields, providing for improvements in cost effectiveness during manufacture. The additional material 142, as discussed above, can be extra material added at the throat 130, such as during forming of the nozzle assembly 100 or by adding the extra material after forming the nozzle assembly 100. The additional material 142 can be the same material as the remainder of the nozzle assembly 100, but being a greater amount of local material such that the throat 130 is formed as having lesser cross-sectional area than intended for the finally-formed throat 130 at each nozzle 104 of the nozzle assembly 100.

The formed portion 132 is then formed by machining the additional material 142 until the formed portion 132 defines a particular cross-sectional area for the throat 130. The maximum cross-sectional area 144 for the formed portion 132 can be defined parallel to the throat 130 or in the radial direction, for example, and/or can be arranged at or aligned with the throat 130. Machining the formed portion 132 from the additional material 142 provides for achieving tight tolerances at the throat 130, in addition to the high yields of production with the additional material 142. In this way, high yield production can be achieved while maintaining tight tolerances at the throat 130 to maximize engine performance. Such a method is easier and more cost effective than attempting to define the throat 130 by maintaining the tight tolerances at the pressure and suction sides of the adjacent airfoils.

It should be further appreciated from FIG. 4 that the shape of the formed portion 132 can be curved or curvilinear in the axial direction. The formed portion's curve should be non-drastic in order to maintain aerodynamic efficiencies at the throat 130, as opposed to generating flow separation or turbulence. Therefore, it should be appreciated that the cross-sectional geometry of the formed portion 132 is not limited to that as shown, but can be any shape that improves or increases aerodynamic efficiency, or minimizes flow inefficiencies formed by the formed portion 132.

Figure 5:
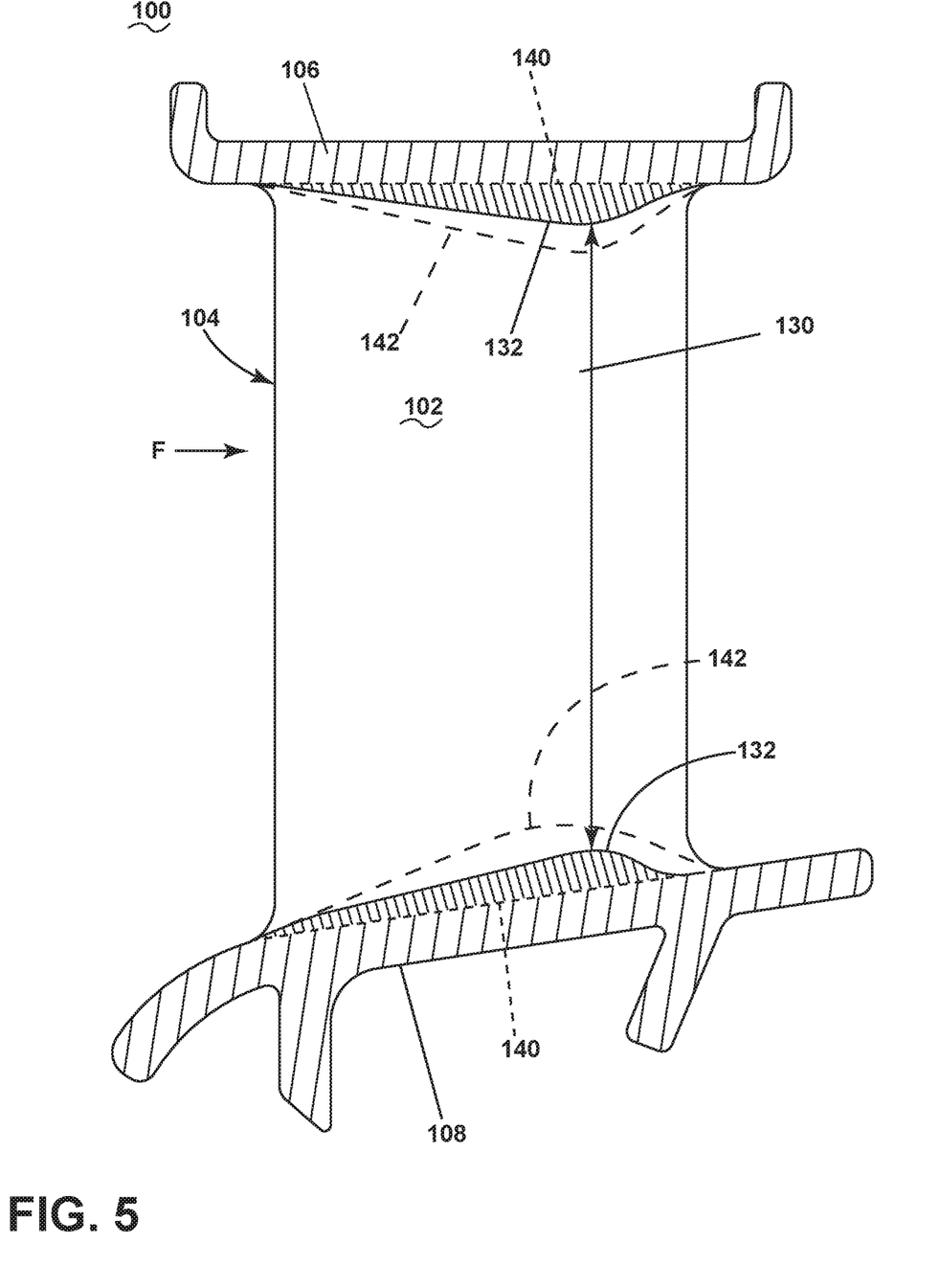
FIG. 5 is a view of a vane for a nozzle, having formed portions provided at an outer band and an inner band.

Referring to FIG. 5, the nozzle assembly 100 is shown in a schematic axial section taken across section V-V of FIG. 3. A flow direction can be defined by F, passing along the figure from left to right. The nozzle assembly 100 can include the formed portion 132 at both the outer band 106 and the inner band 108, collectively defining the throat 130 at any given nozzle 104.

Shown in broken line, additional material 142 can be added or formed with the nozzle 104 at both the outer band 106 and the inner band 108. The additional material 142 at both the outer and inner band 106, 108 is then formed to form the formed portions 132. Additionally, shown in broken line, is the delineation line 140, which can represent the average radial extent of the outer and inner bands 106, 108, such that the additional material 142 and the formed portion 132 both extend into the throat 130 to effectively decrease the total cross-sectional area of the throat 130 as compared with that as defined by the delineation lines 140.

From FIG. 5, it should be appreciated that the additional material 142 as well as the formed portion 132 can be provided at both of or either of the inner band 108 or the outer band 106, such that the cross-sectional area of the throat 130 can be defined at different locations. For example, in a case the formed portion 132 may extend too far into the throat 130, in order to minimize the creation of flow separation or turbulence, a smaller formed portion 132 can be utilized at both the outer and inner bands 106, 108 in lesser extent, minimizing local flow separation and turbulence, while still achieving consistent tight tolerances for the throat cross-sectional areas.

Figure 6:
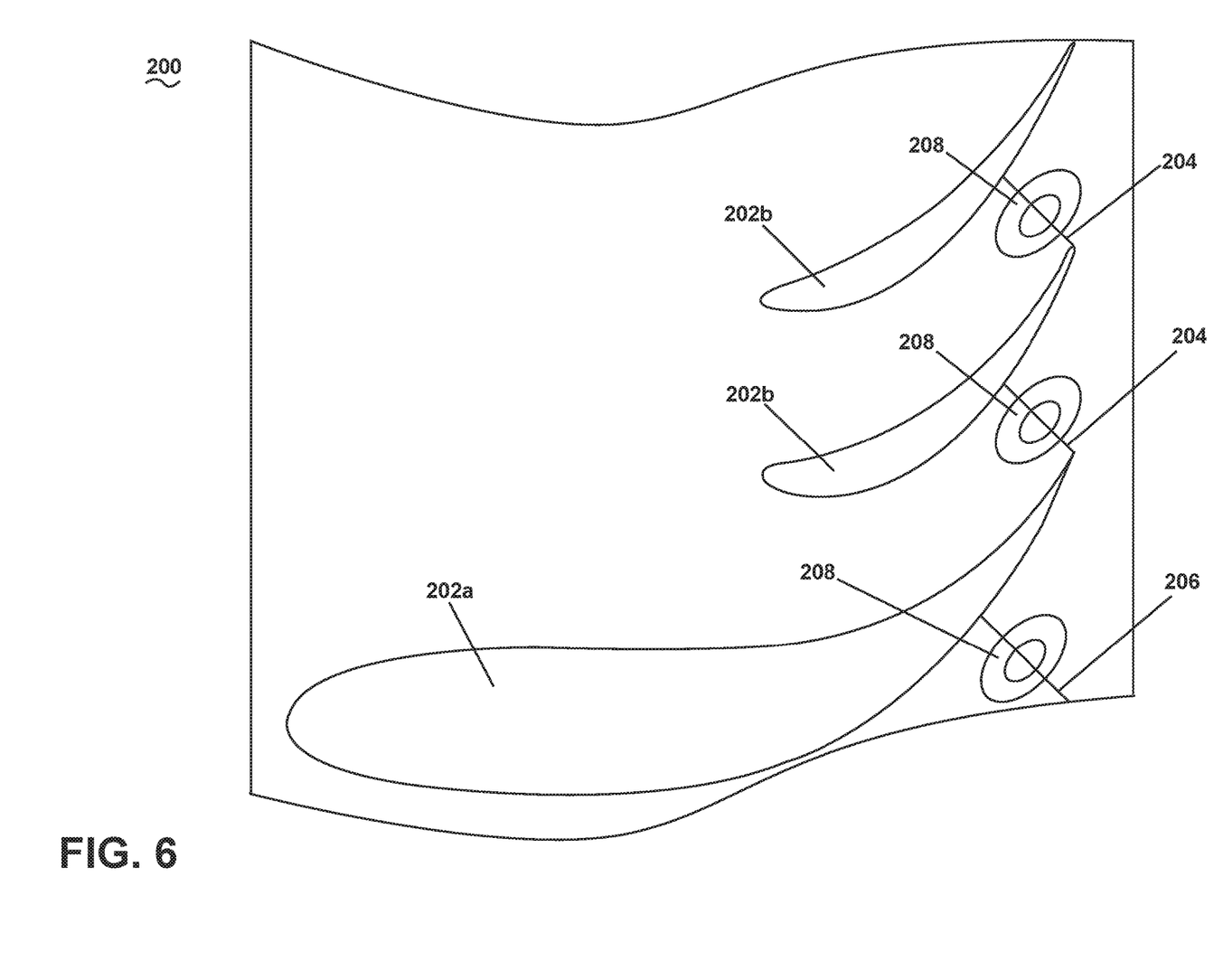
FIG. 6 is a cross-sectional view of an alternate nozzle including three vanes and three contoured portions.

Referring to FIG. 6, another nozzle assembly 200 is shown in schematic, section view, showing airfoils as three vanes 202a, 202b provided on the nozzle assembly 200, with two vanes 202b having similar sizes, and one vane 202a being larger than the other two vanes 202b. While shown and described as vanes 202a, 202b in the nozzle assembly 200, it should be appreciated that any type of airfoil can be utilized to form the nozzle assembly, such as blades, vanes, struts, or other airfoil-shaped features. Each nozzle assembly 200 can define two throats 204, as well as partially define two additional throats 206 among adjacent nozzle assemblies (not shown). Similar to those discussed in FIGS. 3-5, the nozzle assembly 200 can include three formed portions 208, which can partially define the throats 204, 206. The formed portions 208 can be used to maintain the throats 204, 206 within the tight tolerances required for the components or the engine.

It should be further appreciated that the nozzle can have more or less than three airfoils, such as having two airfoils with one large vane and one small vane. In another example, there can be one large vane, and at least two small airfoils, including any suitable number of small airfoils relative to the one large vane. Furthermore, while the airfoils are shown aligned with their trailing edges, it should be understood that such an organization is exemplary only, and that the actual arrangement can be, in non-limiting examples, aligned at the leading edge, aligned based upon a chord-wise center of the airfoils, un-aligned, or in any arrangement; particularly where the throat is not defined relative to the trailing edge of an adjacent vane. Further still, the position of the throat can vary between adjacent sets of airfoils, and do not need to be axially or circumferentially aligned, as shown in FIG. 6. Thus, it should be appreciated that FIG. 6 shows but one example, and that a myriad of variation in organization, sizing, or arrangement of the airfoils and associated nozzles or throats is contemplated.

Figure 7:
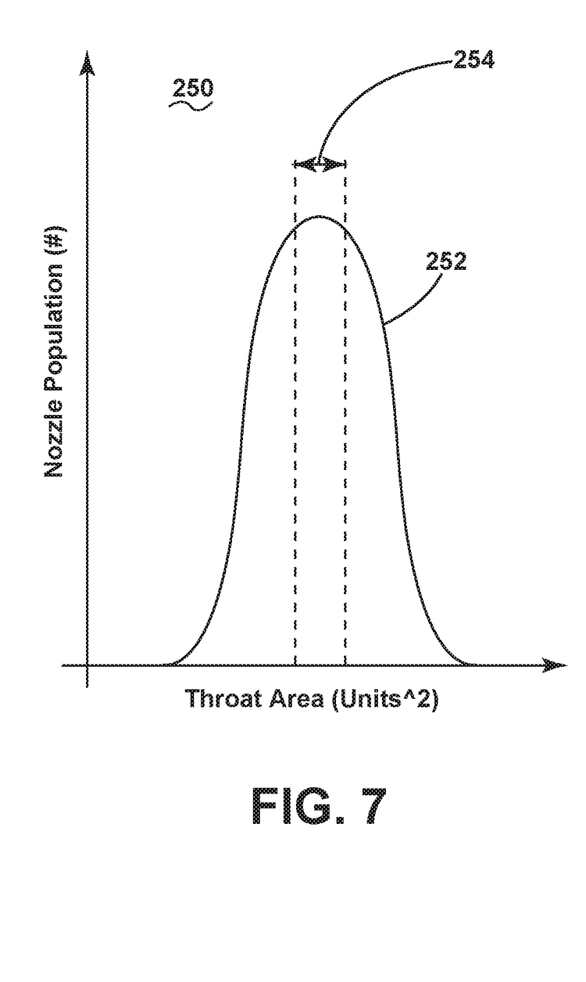
FIG. 7 is a graph showing a plot of a distribution of nozzle throat area from a traditional or conventional manufacturing process without utilizing the formed portions of FIGS. 3-5.

Referring now to FIG. 7, a graph 250 including a plot 252 illustrates a normal distribution for the throat area for a certain population of nozzles under a traditional manufacture style, such as casting. A target area 254 is identified over the plot 252. As can be appreciable, a significant portion of the plot 252 exists outside of the target area 254, representative of a low yield for the nozzles within the target throat area. Thus, one can appreciate that there is a need for producing tight tolerances for maintaining the throats within the target area 254 at a high rate of yield.

Figure 8:
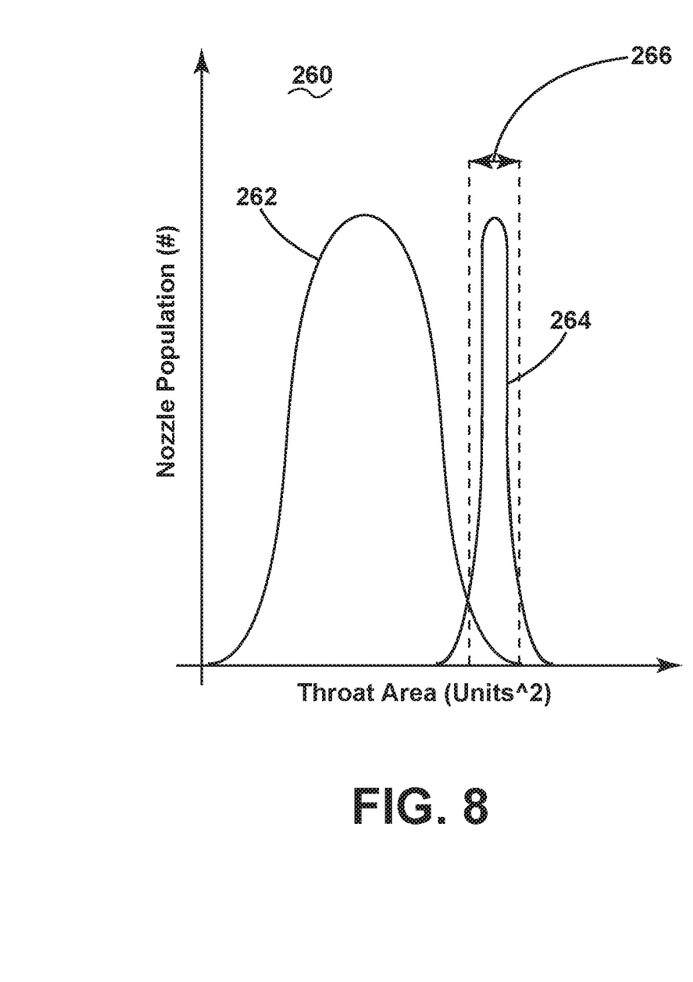
FIG. 8 is another graph showing two plots representative of a distribution of nozzles from an initial fabrication and utilizing the formed portions of FIGS. 3-5.

Referring now to FIG. 8, showing a graph 260 representing the process discussed herein, including forming the additional material and the formed portions to form the throat. More specifically, a first plot 262 illustrates a distribution for the throat over a nozzle population after initial fabrication. The initial fabrication is formed having the additional material at the throat, such that the throat area is formed smaller than a target area 266. As the initial fabrication shown in the first plot 262 is not the final product or restricted to the tight tolerances of the throat, the initial yield becomes high, which provides for significant cost reduction during manufacture.

After initial fabrication, a second plot 264 represents the throat being machined from the initial fabrication and the additional material to become the formed portion. As is appreciable from the second plot 264, a significant portion of the nozzle population is formed within the target throat area 266, achieving tight tolerances along with a high yield.

While such a method represented in FIG. 8 includes an additional step and additional material as compared with that of a traditional manufacture method, such as that of FIG. 7, the method of FIG. 8 provides for very tight tolerances in a very high yield, which improves overall cost effectiveness, as well as consistent improvements to overall engine performance.

Figure 9:
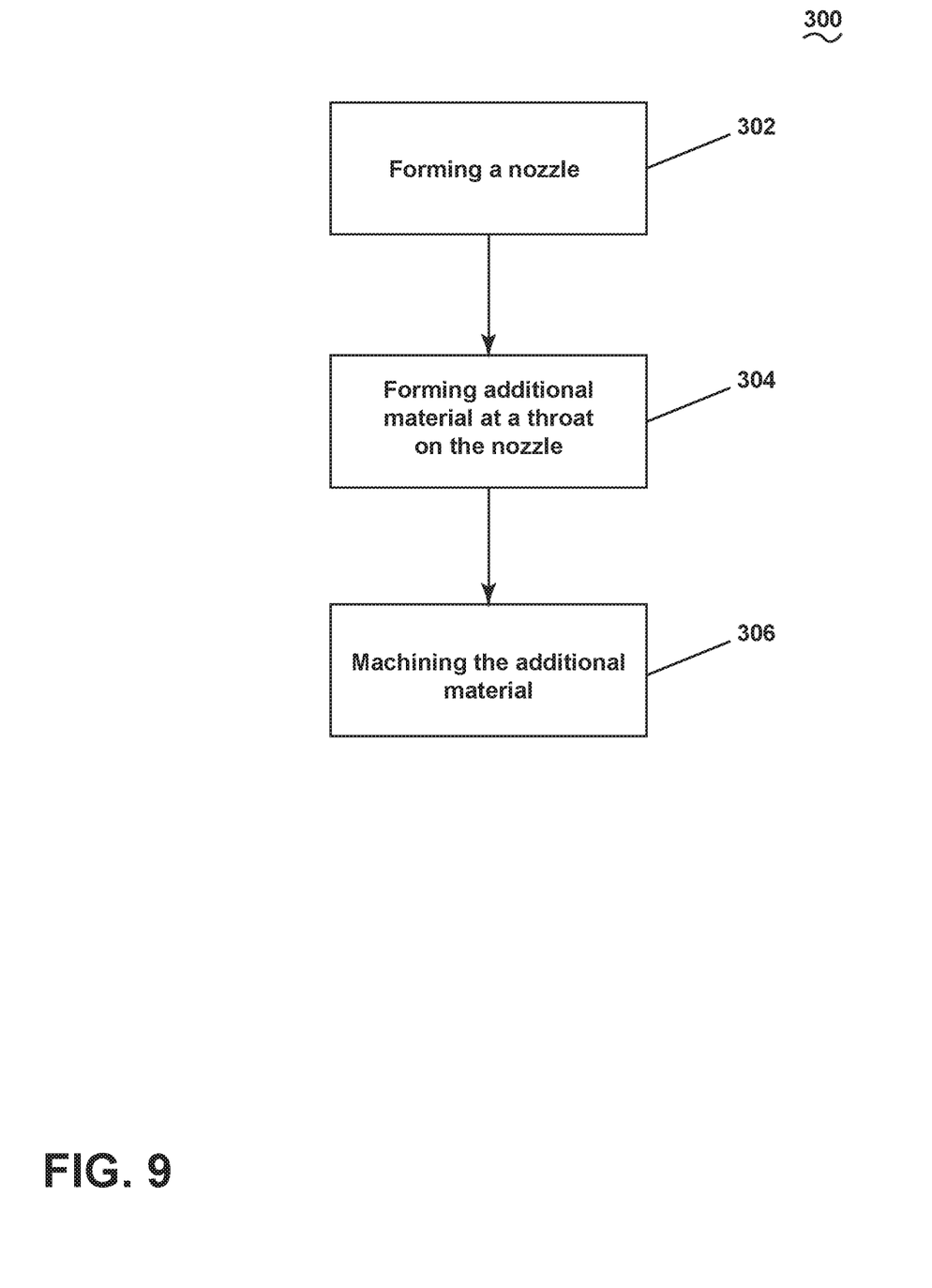
FIG. 9 is a flow chart illustrating a method of forming a throat for a nozzle.

Referring now to FIG. 9, a method 300 of forming a nozzle assembly for a turbine engine, such as the nozzle assemblies described herein, can include: at 302, forming a nozzle; at 304, forming additional material at a throat on the nozzle; and at 306, machining the additional material to form a formed portion at the throat.

At 302, forming the nozzle can include forming the nozzle having an inner band and an outer band, with the inner band being radially interior of the outer band. The nozzle can further include at least one airfoil coupled to and extending between the inner band and the outer band, with the at least one airfoil at least partially defining a throat. The throat can be a minimum cross-sectional area defined between adjacent airfoils for air or fluid passing through the nozzle.

At 304, forming the additional material on the throat can include forming an enlarged portion on one or both of the inner band and the outer band at the throat. The additional material can be enlarged, as defining a throat having a lesser cross-sectional area than is intended for the finalized nozzle. As such, the additional material is intended to be formed or removed in some way to achieve the desired cross-sectional area for the throat. In one example, forming the nozzle at 302, and forming the additional material 304 can utilize the same method of manufacture, or can be formed at the same time, such as by casting or additive manufacturing, while any suitable method of manufacture is contemplated. Additive manufacturing can include, for example, 3D printing, direct metal laser machining, direct metal laser sintering, or electroforming, in non-limiting examples. Furthermore, forming the additional material can include applying a coating or an air plasma spray (APS) onto the nozzle at the throat.

The method can further include measuring the throat as formed by the additional material. Measuring the throat with the additional material provides for determining the amount of the additional material needed to be removed when forming the formed portion at 306. In an example where the entire annular ring of nozzles assemblies is formed, the method can include measuring all throats to determine if all cross-sectional areas for the throats are currently less than the desired cross-sectional area for each throat. If not, the method can further include adding more additional material at any throat that has a cross-sectional area greater than a desired cross-sectional area for the throat.

At 306, the method includes machining the additional material to reduce the additional material, and increase the cross-sectional area of the throat. The machining removes at least a portion of the additional material such that the cross-sectional area of the final throat defined by the formed portion is greater than the cross-sectional area of the throat defined by the additional material prior to machining. Machining the additional material can include, in non-limiting examples, adaptive machining, grinding, laser cutting, or grit blasting. Machining the additional material can be done to form an aerodynamic surface from the additional material as the formed portion to define the throat within tight tolerances, while minimizing the potential for flow separation or turbulence generated at the throat from the formed portion.

In one example, the nozzles as described herein are formed as a single fabricated piece, such as a monolithic or unitary item, such as by additive manufacturing, as opposed to forming the nozzle as separate elements and adding the additional material to the already-formed piece. It is contemplated that the complete turbine nozzle or vane frame rings can be fabricated as a single annular piece, including multiple nozzles and throats to define a circumferential assembly. In such an instance, the additional material can be created with the complete fabricated assembly.

Manufacturing techniques have previously limited the fixturing and manufacturing tolerances for throat assembly and control. In one non-limiting example, the throat control has a target uncertainty that is less than 0.5%, in order to maintain efficient and consistent engine performance, operability, and thrust. Traditional throat manufacture methods consistently have a +/−0.5% area variation for an entire annular nozzle assembly. The apparatus and methods as described herein provide for enabling very tight control of the throats and the cross-sectional areas thereof for single piece nozzles or vane frames, with less than 0.5% area variation at the throats, which provide for consistent engine efficiency, operably, performance, and thrust at the throats and nozzles; particularly in the high-pressure turbine. Furthermore, adding the additional material and then machining the formed portions from the additional material enable the final nozzle assembly to be aerodynamically efficient at the formed portions, minimizing any created engine inefficiencies, while realizing the performance and efficiency benefits of the tight throat control.

In another example, different portions of the throat or local component can have the added material, and it should be appreciated that such additions are not solely limited to the inner or outer band. For example, APS or other similar material can be added to the airfoils, such as an airfoil suction side, and then either the material on the airfoils can be formed to the tight tolerances for the throats. In another example, material can be added to the airfoils or other components, and then the original inner or outer bands (or even adjacent airfoils) can be formed to meet the tight tolerances. Therefore, it should be appreciated that it is contemplated that the additional material can be added to any portion of the component or engine at the throats, and that any portion of the component or engine at the throat can be formed or otherwise varied or adapted to define the throat within the tight tolerances.

It should be understood that any combination of the above described geometries or positions with respect to the orientation and location of the airfoils, vanes, bands, or throat as described herein are also contemplated. By way of non-limiting example formed portions could be any shape at least partially defining the throat, in any position. The formed portions, airfoils, blades, vanes, and throats as illustrated herein are for illustrative purposes only and not meant to be limiting. Furthermore, it is contemplated that any suitable material can be utilized to shrink or close the throat, which is then formed to form the tight tolerances for the throat.

Benefits associated with the formed portion as described herein are related to tighter tolerances for the throats in turbine engines, which provide for improving engine efficiency, performance, and thrust. The formed portions provide such benefits with little to no impact or effect on the flow through the throats, such as little to no flow separation or turbulence generated locally, while realizing the performance benefits at the throat. The method as described provides for consistently achieving these tighter tolerances. Commercially better efficiency, performance, and thrust can decrease repair and maintenance costs, and extend the life of the engine component.

The aspects disclosed herein provide a method and apparatus for consistently achieving tight tolerances for nozzles and engine components at the engine throat. The technical effect is that the above described aspects enable tighter tolerances and more consistent throats across all nozzles in a nozzle assembly. One non-limiting advantage that can be realized in the above aspects is that the above described aspects have superior engine performance, efficiency, and thrust. Consistently achieving tighter tolerances provides for a consistent nozzle size for the engine across all nozzle assemblies, which minimizes local losses or inefficiencies, which are otherwise generated by local throat size inconsistencies among the nozzle assembly.

Many other possible aspects and configurations in addition to that shown in the above figures are contemplated by the present disclosure. To the extent not already described, the different features and structures of the various aspects can be used in combination with others as desired. That one feature cannot be illustrated in some of the aspects is not meant to be construed that it cannot be, but is done for brevity of description. Thus, the various features of the different aspects can be mixed and matched as desired to form new aspects, whether or not the new aspects are expressly described. In one non-limiting example, aspects of FIG. 3, 5, or 6 may be combined with one another in varying ways.

The formed portions as described herein can be manufactured utilizing additive manufacturing technologies or other advanced casting manufacturing technologies such as investment casting, 3-D printing, laser drilling, EDM drilling, direct metal laser melting, direct metal laser sintering, or electroforming in non-limiting examples. The technologies available provide cost benefits along with the other benefits described. It should be understood that other methods of forming the cooling circuits and cooling holes described herein are also contemplated and that the methods disclosed are for exemplary purposes only.

It should be appreciated that application of the disclosed design is not limited to turbine engines with fan and booster sections, but is applicable to turbojets and turboprop engines as well.

Various characteristics, aspects, and advantages of the present disclosure may also be embodied in the following technical solutions as defined by the following aspects or clauses:

1. A nozzle assembly for a turbine engine, the nozzle assembly comprising: an outer band; an inner band spaced from the outer band; a set of airfoils extending between the outer band and the inner band and defining a throat as a minimum cross-sectional area between adjacent airfoils of the set of airfoils; and at least one formed portion provided on one of the outer band or the inner band at the throat, with a volume of the formed portion removed at the throat to define the throat.
2. The nozzle assembly of aspect 1 wherein the set of airfoils includes two airfoils.
3. The nozzle assembly of aspects 1-2 wherein the set of airfoils includes three airfoils.
4. The nozzle assembly of aspect 3 wherein one airfoil is larger than at least one of the other two airfoil.
5. The nozzle assembly of aspects 1-4 wherein the at least one formed portion is on the outer band.
6. The nozzle assembly of aspects 1-5 wherein the at least one formed portion includes two formed portions, with one formed portion provided on the outer band and the other formed portion provided on the inner band.
7. The nozzle assembly of aspects 1-6 wherein the at least one formed portion has an arcuate profile.
8. The nozzle assembly of aspect 7 wherein the one of the outer band or the inner band upon which the at least one formed portion is provided is partially annular.
9. The nozzle assembly of aspects 1-8 wherein the set of airfoils includes a set of vanes in a high pressure turbine.
10. The nozzle assembly of aspect 9 wherein the set of vanes is in the first stage of the high pressure turbine.
11. The nozzle assembly of aspects 1-10 wherein the formed portion is formed as additional material and is formed to form the throat to be met at maximum deviation.
12. The nozzle assembly of aspects 1-11 wherein the formed portion is aerodynamically contoured to minimize flow separation or turbulence created by the formed portion.
13. A method of forming a nozzle assembly for a turbine engine, the method comprising: forming a nozzle having an inner band and an outer band, with at least one airfoil coupled to and extending between the inner band and the outer band, with the at least one airfoil partially defining a throat; forming additional material on at least one of the inner band or the outer band at the throat; and machining the additional material to form a formed portion at the throat.
14. The method of aspect 13 wherein forming the nozzle and forming the additional material are formed by the same method of manufacture.
15. The method of aspects 13-14 further comprising measuring the throat prior to machining the additional material.
16. The method of aspects 13-15 wherein forming the additional material includes applying a coating or APS onto the nozzle at the throat.
17. The method of aspects 13-16 wherein machining the additional material further comprises at least one of adaptive machining, grinding, or grit blasting.
18. The method of aspects 13-17 wherein machining the additional material further comprises forming an aerodynamic surface as the formed portion to minimize flow separation and turbulence at the throat.

19. A nozzle for a turbine engine comprising: an outer band; an inner band spaced from the outer band; a first airfoil extending between the outer band and the inner band; a second airfoil extending between the outer band and the inner band, spaced from the first airfoil and defining a throat as a minimum cross-sectional area defined between the first airfoil and the second airfoil; a formed portion formed on at least one of the outer band or the inner band at the throat and partially defining the minimum cross-sectional area for the throat.

20. The nozzle of aspect 19 wherein the formed portion includes a greatest thickness provided at the throat.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A nozzle assembly for a turbine engine, the nozzle assembly comprising:
   an outer band;
   an inner band spaced from the outer band;
   a first airfoil extending between the outer band and the inner band, extending between a leading edge and a trailing edge, and including a first pressure side and a first suction side;
   a second airfoil extending between the outer band and the inner band and spaced from the first airfoil and including a second pressure side and a second suction side;
   a throat defined as a minimum cross-sectional area between the first airfoil and the second airfoil extending between the trailing edge of the first airfoil and the second suction side of the second airfoil;
   additional material provided at the throat, with the additional material provided on at least a portion of one of the inner band or the outer band; and
   a formed portion positioned in the additional material at the throat with a central portion of the formed portion aligned at the throat;
   wherein the central portion defines a maximum cross-sectional distance for the formed portion arranged at the throat.

2. The nozzle assembly of claim 1 wherein the additional material is provided on both of the outer band and the inner band.

3. The nozzle assembly of claim 1 wherein the formed portion includes at least two formed portions, with a first formed portion provided on the outer band and a second formed portion provided on the inner band.

4. The nozzle assembly of claim 1 wherein the formed portion has an arcuate profile.

5. The nozzle assembly of claim 1 wherein the first airfoil and the second airfoil includes a first vane and a second vane in a high pressure turbine.

6. The nozzle assembly of claim 5 wherein the first vane and the second vane are in a first stage of the high pressure turbine.

7. The nozzle assembly of claim 1 wherein the formed portion is formed at a maximum deviation.

8. The nozzle assembly of claim 1 wherein the formed portion is aerodynamically contoured to minimize flow separation or turbulence created by the formed portion.

9. The nozzle assembly of claim 1 wherein the formed portion is formed by electrical discharge machining.

10. The nozzle assembly of claim 1 wherein the additional material is a metal.

11. The nozzle assembly of claim 1 wherein the first pressure side of the first airfoil is concave and the second suction side of the second airfoil is convex.

12. A method of forming a nozzle assembly for a turbine engine, the method comprising:
    forming a nozzle having an inner band and an outer band, with at least one airfoil coupled to and extending between the inner band and the outer band, with the at least one airfoil partially defining a throat;
    forming additional material on at least one of the inner band, the outer band, or on the at least one airfoil at the throat; and
    machining the additional material to form a formed portion at the throat;
    wherein forming the nozzle and forming the additional material are formed by the same method of manufacture.

13. The method of claim 12 further comprising measuring the throat prior to machining the additional material.

14. The method of claim 12 wherein forming the additional material includes applying a coating or APS onto the nozzle at the throat.

15. The method of claim 12 wherein machining the additional material further comprises at least one of adaptive machining, grinding, or grit blasting.

16. The method of claim 12 wherein machining the additional material further comprises forming an aerodynamic surface as the formed portion to minimize flow separation and turbulence at the throat.

17. A nozzle for a turbine engine comprising:
    an outer band;
    an inner band spaced from the outer band;
    a first airfoil extending between the outer band and the inner band, extending between a leading edge and a trailing edge, and including a first pressure side and a first suction side;
    a second airfoil extending between the outer band and the inner band, spaced from the first airfoil, and including a second pressure side and a second suction side;
    a throat defined as a minimum cross-sectional area between the first airfoil and the second airfoil defined extending between the trailing edge of the first airfoil and the second suction side of the second airfoil;
    additional material provided at the throat, extending over, and covering at least a portion of one of the outer band or the inner band; and
    a formed portion formed in the additional material at the throat and defining a maximum cross-sectional distance for the formed portion at the throat.

18. The nozzle of claim 17 wherein the first pressure side of the first airfoil is concave and the second suction side of the second airfoil is convex.

* * * * *